United States Patent [19]

Yokota et al.

[11] Patent Number: 4,628,070

[45] Date of Patent: Dec. 9, 1986

[54] VINYL CHLORIDE RESIN-BASED COMPOSITION FOR FLOPPY DISC JACKET

[75] Inventors: Tohru Yokota, Ibaraki; Kaname Inoue, Kanagawa; Ryozo Tanizawa, Tokyo; Hideyuki Asou, Ibaraki; Hajime Kitamura, Chiba, all of Japan

[73] Assignee: Shin Etsu Chemical Co., Ltd., Tokyo, Japan

[21] Appl. No.: 825,354

[22] Filed: Feb. 3, 1986

[30] Foreign Application Priority Data

Feb. 6, 1985 [JP] Japan ................................. 60-21473

[51] Int. Cl.[4] .................. C08K 3/04; C08L 39/04; C08L 51/00; C08L 53/00
[52] U.S. Cl. ................................. 524/504; 524/496; 524/505; 524/516; 525/73; 525/91; 525/205
[58] Field of Search ............... 524/496, 504, 505, 516; 525/73, 91, 205

[56] References Cited

U.S. PATENT DOCUMENTS 3,639,509  2/1972  Andrascheck et al. ............... 525/73
4,458,046  7/1984  Hornbaker et al. .................. 525/73

FOREIGN PATENT DOCUMENTS 0053080  6/1982  European Pat. Off. .
 175224  3/1986  European Pat. Off. .
3425990  1/1986  Fed. Rep. of Germany .
0044703  1/1982  Japan ................................. 524/516
0038982  3/1984  Japan .

OTHER PUBLICATIONS

Derwent Abs. 30394U/22 (Farbwerke Hoechst AG 1973 (DE 1595708).
Chem. Abs. 99-105808(14) 1983, Hoering et al, (Plaste Kautsch vol. 30(6) pp. 305-310, 1983).
Chem. Abs. 88-38193(6) Oishi et al, 1977.

*Primary Examiner*—Herbert J. Lilling
*Attorney, Agent, or Firm*—Hopgood, Calimafde, Kalil, Blaustein & Judlowe

[57] ABSTRACT

The invention provides a formulation of a vinyl chloride resin-based composition suitable for preparing floppy disc jackets having high heat resistance with a Clash-Berg temperature of 75° C. or higher comprising, as the essential components, (A) a copolymer of vinyl chloride with a N-substituted maleimide as the comonomer, optionally in combination with a homopolymeric polyvinyl chloride resin, (B) an impact-strength improving agent which is preferably a vulcanizable synthetic rubber and (C) carbon black.

3 Claims, No Drawings

VINYL CHLORIDE RESIN-BASED COMPOSITION FOR FLOPPY DISC JACKET

BACKGROUND OF THE INVENTION

The present invention relates to a vinyl chloride resin-based composition suitable for preparing jackets of floppy discs by molding or, more particularly, the invention relates to a resin composition excellent in workability in molding, heat-resistance, tensile strength and dimensional stability.

A floppy disc jacket is a cover casing in a square form used to envelop a floppy disc in the form of a thin circular disc which should be protected from mechanical damages and contamination with dusts. The floppy disc is inserted into the disc-driving deck of a computer or other electronic instruments as containined in a jacket therefor.

Conventionally, copolymers of vinyl chloride and vinyl acetate have been used principally as the material of floppy disc jackets taking advantage of the good workability in shaping by molding and other advantageous properties of the copolymeric resin though not without a requirement for further extending the durability of the incessant use of such a floppy disc and jacket under various environmental conditions along with the recent trend of increasing prevalence of electronic office appliances such as office computers, personal computers, word processors and the like. For example, miniature-sized floppy discs of space-saving type with a diameter of 3.5 inches have been developed and manufactured to comply with the prevailing compactness of personal computers and the like. Such a small floppy disc of course requires reduction of size of the jacket therefor. This trend requires more and more increased flowability of the resin composition in molding and also requires increase of heat resistance against thermal effect from the disc driving decks as well as increase of the dimensional stability and the mechanical strength of the jacket such as abrasion resistance, tensile strength and the like in order to ensure good operability of the floppy disc.

Recently, attempts are being made in order to improve the heat resistance of floppy disc jackets to comply with the above mentioned requirements by using homopolymeric polyvinyl chloride resins, polymer blends of a homopolymeric vinyl chloride resin and a post-chlorinated polyvinyl chloride and the like instead of the copolymers of vinyl chloride and vinyl acetate, but they are inferior in the workability in moding and in the mechanical strength despite the insufficient improvement thereby in the heat resistance.

SUMMARY OF THE INVENTION

The present invention provides a vinyl chloride resin-based composition having excellent workability in molding and good heat resistance, tensile strength and dimensional stability of the floppy disc jacket molded thereof.

The vinyl chloride resin-based composition of the invention for floppy disc jackets having a Clash-Berg temperature of 75° C. or higher comprises:
(A) 100 parts by weight of a vinyl chloride-based resin base composed of
  (a) 10 to 100% by weight of a copolymer of vinyl chloride and a N-substituted maleimide in a weight proportion of 50:50 to 95:5 having an average degree of polymerization in the range from 400 to 1000, and
  (b) up to 90% by weight of a polyvinyl chloride resin having an average degree of polymerization in the range from 400 to 1000;
(B) from 1 to 20 parts by weight of an impact-strength improving agent, which is preferably a vulcanizable synthetic rubber; and
(C) from 0.1 to 5 parts by weight of carbon black.

DETAILED DESCRIPTION OF THE PREFERRED EMBODIMENTS

The vinyl chloride-based resin base (A) as the principal component of the inventive composition is a single resin of the component (a) as aforementioned or a combination of the component (a) and the component (b). The component (a) is a copolymer having an average degree of polymerization in the range from 400 to 1000 and prepared by the copolymerization of 50 to 95% by weight of vinyl chloride and 50 to 5% by weight of a N-substituted maleimide. The N-substituted maleimide to be copolymerized with vinyl chloride is represented by the general formula

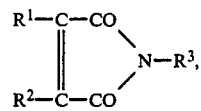

in which $R^1$ and $R^2$ are each an atom or a group selected, each independently from the other, from the atoms of hydrogen, chlorine, bromine and flourine, a cyano group and alkyl groups having 1 to 3 carbon atoms and $R^3$ is an unsubstituted or substituted monovalent hydrocarbon group selected from the class consisting of aliphatic groups, alicyclic groups and aromatic groups having 1 to 30 carbon atoms. Exemplary of the hydrocarbon group suitable and preferable as $R^3$ are methyl, tert-butyl, cyclohexyl, bicyclo-2,2,1-heptyl-2-methyl and triphenylmethyl benzyl groups as well as a residual group of 9,10-ethano-9,10-dihydro-anthracene.

The monomeric ratio of copolymerization in the copolymeric resin as the component (a) should be in such a range that from 50 to 5% by weight of the N-substituted maleimide compound is copolymerized with 50 to 95% by weight of vinyl chloride. Use of less than 5% by weight of the N-substituted maleimide compound would cause insufficient improvement of the heat resistance of the resultant resin composition while, on the other hand, use thereof in an amount exceeding 50% by weight would give a copolymer having an unduly high melting temperature so that deterioration of the physical properties of the shaped products thereof is sometimes unavoidable due to the difficulty in obtaining homogeneous dispersion and inhomogeneous melting caused in the mixing procedure with the polyvinyl chloride resin as the optional component (b) while no remarkable effect of improvement in the heat resistance can be obtained as expected. The preferred range of the average degree of polymerization of the copolymer (a) is from 400 to 1000 since an excessively high value of the degree of polymerization would cause decrease in the workability while a too low value thereof would result in inferior mechanical strengths and heat resistance.

The vinyl chloride resin as the component (b) having an average degree of polymerization of 400 to 1000 and optionally used in combination with the above described copolymer as the component (a) is selected from homopolymeric polyvinyl chloride resins and copolymers of vinyl chloride with one or more of comonomers such as ethylene, propylane and the like, multiple copolymers prepared by graft-copolymerization of vinyl chloride to an ethylenic polymer such as copolymers of ethylene and vinyl acetate, ethylene and ethyl acrylate and so on, chlorinated polyethylenes and the like as well as polymer blends thereof.

The compounding ratio of the vinyl chloride-based resin as the component (b) to the aforementioned copolymer as the component (a) should not exceed 90% by weight of the component (A) as a combination of the components (a) and (b). It is preferable that the content of the copolymerized N-subsituted maleimide as the monomeric constituent is at least 5% by weight based on the total amount of the components (a) and (b) in order to keep the Clash-Berg temperature at a level of 75° C. or higher to suffice the object of the present invention.

Further, the impact-strength improving agent as the component (B) is preferably a vulcanizable rubber. Examples of such a rubbery component include polybutadienes jointly graft-copolymerized with styrene and methyl methacrylate (MBS), polybutadienes jointly graft-copolymerized with acrylonitrile and styrene (ABS), polybutadienes jointly graft-copolymerized with acrylonitrile and alpha-methyl styrene (AB$\alpha$S), EPDMs graft-copolymerized with vinyl chloride, EPDMs jointly graft-coplymerized with styrene and acrylonitrile, plybutadienes graft-copolymerized with styrene, methyl methacrylate and acrylonitrile (MABS), polyacrylates such as polybutyl acrylate graft-copolymerized with methyl methacrylate or jointly graft-copolymerized with methyl methacrylate and styrene, butyl rubbers graft-copolymerized with vinyl chloride, block copolymers of styrene-butadiene-styrene, radial block copolymers of styrene and butadiene, styrene-butadiene rubbers, vulcanizable acrylate rubbers, EPDMs and the like.

Examples of the carbon black as the component (C) include acetylene black, furnace black, channel black, thermal black, lamp black and the like with the preference of "Ketjen Black" (a trade name, manufactured by Lion-Akzo Co., Ltd.) which is a kind of furnace black with a particularly small particle diameter distribution among the above named ones in order to decrease the electric resistivity of the composition to suffice the purpose of the present invention.

The compounded amounts of the above described components (B) and (C) are in the ranges from 1 to 20 parts by weight of the impact-strength improving agent as the component (B) and from 0.1 to 5 parts by weight of the carbon black as the component (C) per 100 parts by weight of the vinyl chloride-based resin base as the component (A).

Optionally, the resin composition of the invention may further contain any of the conventional additives known in the art of resin processing such as stabilizers, lubricants, antistatic agents and others. Examples of the stabilizers include metal salts and metal soaps such as laurates and stearates of calcium, barium, cadmium or zinc; lead-based stabilizers such as tribasic lead sulfate, dibasic lead phosphite, dibasic lead phthalate, white lead, i.e. basic lead carbonate, lead laurate, lead stearate and the like; tin-based stabilizers such as di-n-alkyltin mercaptides, di-n-alkyltin dilaurates, dibutyltin dimaleate, dibutyltin lauryl mercaptide, diocytltin bis(isooctyl thioglycolate), di-n-octyltin maleate polymer, dibutyltin mercapto propionate and the like; antimony-based stabilizers such as antimony mercapto carboxylates or ester salts thereof and the like; phosphate compounds and others.

Examples of the lubricants include metal soaps, stearic acid, glyceryl monostearate, ethyl diaminostearate, paraffins, low-molecular polyethylene waxes and the like.

Various kinds of surface active agents are used as the antistatic agent including cationic, anionic, non-ionic and amphoteric ones.

Additionally, the composition may further be admixed with a heat-resistance improvers such as copolymers of acrylonitrile, alpha-methylstyrene and butadiene, copolymers of methyl methacrylate and acrylic acid esters and the like, and, furthermore, with other additives conventionally compounded in vinyl chloride resin-based compositions such as processing aids, fillers, flame retardants, smoke reducing agents, antioxidants and the like each in such a limited amount that no adverse influences are caused on the object of the present invention.

The resin composition of the present invention is obtained in a desired form such as pellets or the like by uniformly mixing the above-mentioned components in a mixer and milling the mixture in an extruder followed by extrusion therefrom. Floppy disc jackets having a long serviceable life can be obtained of the composition which can be easily processed by calendering or the like method by virtue of the excellent workability thereof in molding since the shaped articles have excellent heat resistance, dimensional stability and mechanical strengths such as tensile strength, abrasion resistance and the like.

Examples and comparative examples are given in the following to illustrate the inventive resin composition in more detail. In the description below, the expression of "parts" always refers to "parts by weight".

EXAMPLES

Resin compositions were prepared each by compounding, on a roll mixer at 180° C., one of the copolymers (a-1) to (a-11) indicated below as the component (A)-(a), one of the polyvinyl chloride resins (b-1) to (b-3) shown below as the component (A)-(b), one of the impact-strength improving agents (B-1) to (B-5) shown below as the component (B) and one of the carbon blacks (C-1) and (C-2) shown below as the component (C) in the formulation indicated in Table 2 in a weight proportion followed by adding 1 part of butyltin maleate and 0.5 part of octyltin laurate as the stabilizers, 0.5 part of glycerin monostearate as the lubricant and 1 part of a quaternary ammonium compound as the antistatic agent each per 100 parts of the total amount of the components (a)-(a) and (A)-(b).

Test pieces were prepared by compression molding of the roll-milled composition at 190° C. and subjected to the following test for the evaluation thereof.

Tensile test: according to the procedure specified in JIS K 6734

Flexure temperature test (Clash-Berg temperature): according to the procedure specified in JIS K 6734

Charpy-impact test: according to the procedure specified in JIS K 6745

Flowability test: measured by using a Koka Model Flow-Tester to give the results in terms of $T_{Q=2}$, i.e. the temperature for the flow of 2 ml/second Components (a-1) to (a-11) as the component (A)-(a)

See Table 1 for the monomer ratio of vinyl chloride and a N-substituted maleimide compound, i.e. N-tert-butyl maleimide or N-cyclohexyl maleimide, as well as the average degree of polymerization.

COMPONENTS (b-1) to (b-3) as the component (A)-(b)

(b-1): a polyvinyl chloride resin having an average degree of polymerization of about 400

(b-2): a polyvinyl chloride resin having an average degree of polymerization of about 700

(b-3): a polyvinyl chloride resin having an average degree of polymerization of about 1000

Impact-strength improving agent as the component (B)

(B-1): an ABS resin manufactured by Mitsubishi Rayon Co., grade HF-3

(B-2): an MBS resin manufactured by Kanegafuchi Chemical Industries Co., trade name "KaneAce", grade B-22

(B-3): an AAS resin manufactured by Mitsubishi Rayon Co., grade MCW (B-4): a vulcanizable acrylate rubber mamufactured by Rohm & Haas Co., grade KM-330

(B-5): an ABαS resin manufactured by Kanegafuchi Chemical Industries Co., trade name "Teralloy", grade A-10

Carbon black as the component (C)

(C-1): acetylene black
(C-2): furnace black

The results of the tests were as shown in Table 3 and each of the test specimens shaped of the compositions formulated according to the present invention, i.e. Experiments No. 1 to No. 8, was excellent having a Clash-Berg temperature of 75° C. or higher and high values of tensile strength and impact strength while the compositions showed values of flowability approximately equivalent to those of the compositions prepared in the comparative Experiments No. 9 to No. 13 thus verifying that the resin compositions according to the invention were quite satisfactory as a material for floppy disc jackets.

TABLE 1

| Component | Ratio of copolymerization, % by weight | | | Average degree of polymerization |
|---|---|---|---|---|
| | Vinyl chloride | N—tert-Butyl maleimide | N—Cyclohexyl maleimide | |
| (a-1) | 80 | 20 | — | 700 |
| (a-2) | 60 | 40 | — | 400 |
| (a-3) | 50 | 50 | — | 400 |
| (a-4) | 90 | 10 | — | 1000 |
| (a-5) | 90 | — | 10 | 700 |
| (a-6) | 95 | — | 5 | 1000 |
| (a-7) | 70 | — | 30 | 700 |
| (a-8) | 50 | — | 50 | 400 |
| (a-9) | 80 | — | 20 | 700 |
| (a-10) | 98 | — | 2 | 400 |
| (a-11) | 40 | — | 60 | 1000 |

TABLE 2

| Experiment No. | Component (A)-(a), (parts) | Component (A)-(b), (parts) | Component (B), (parts) | Component (C), (parts) |
|---|---|---|---|---|
| 1 | a-1 (100) | — | B-1 (5) | C-1 (2) |
| 2 | a-2 (30) | b-2 (70) | B-2 (10) | C-1 (2) |
| 3 | a-3 (20) | b-3 (80) | B-3 (20) | C-1 (5) |
| 4 | a-4 (50) | b-1 (50) | B-4 (10) | C-2 (1) |
| 5 | a-5 (100) | — | B-4 (15) | C-2 (1) |
| 6 | a-6 (100) | — | B-5 (1) | C-2 (0.5) |
| 7 | a-7 (20) | b-3 (80) | B-5 (5) | C-1 (2) |
| 8 | a-8 (10) | b-2 (90) | B-5 (10) | C-1 (2) |
| 9 | a-9 (30) | b-1 (70) | B-5 (0.5) | C-1 (2) |
| 10 | a-10 (100) | — | B-5 (5) | C-1 (2) |
| 11 | a-11 (100) | — | B-5 (10) | C-1 (2) |
| 12 | — | b-2 (100) | B-5 (5) | C-1 (2) |
| 13 | Cl-PVC* (50) | b-2 (50) | B-5 (10) | C-1 (2) |

*Post-chlorinated polyvinyl chloride resin

TABLE 3

| Experiment No. | Tensile strength, kg/cm² | Clash-Berg temperature, °C. | Charpy impact strength kg · cm/cm² | Flowability ($T_{Q=2}$, °C.) |
|---|---|---|---|---|
| 1 | 670 | 83 | 5 | 182 |
| 2 | 660 | 80 | 10 | 187 |
| 3 | 650 | 79 | 15 | 190 |
| 4 | 620 | 80 | 10 | 185 |
| 5 | 670 | 81 | 12 | 180 |
| 6 | 650 | 80 | 6 | 190 |
| 7 | 640 | 78 | 5 | 182 |
| 8 | 630 | 76 | 5 | 182 |
| 9 | 640 | 74.5 | 6 | 187 |
| 10 | 580 | 73 | 5 | 182 |
| 11* | — | — | — | — |
| 12 | 570 | 71 | 5 | 182 |
| 13 | 620 | 74 | 3 | 193 |

*The compound could not be milled on the roll mixer.

What is claimed is:

1. A vinyl chloride resin-based composition for floppy disc jackets having a Clash-Berg temperature of 75° C. or higher which comprises:
   (A) 100 parts by weight of a vinyl chloride-based resin base composed of
      (a) 10 to 100% by weight of a copolymer of vinyl chloride and a N-substituted maleimide in a weight proportion of 50:50 to 95:5 having an average degree of polymerization in the range from 400 to 1000, and
      (b) up to 90% by weight of a polyvinyl chloride resin having an average degree of polymerization in the range from 400 to 1000;
   (B) from 1 to 20 parts by weight of an impact-strength improving agent; and
   (C) from 0.1 to 5 parts by weight of carbon black.

2. The vinyl chloride resin-based composition for floppy disc jackets having a Clash-Berg temperature of 75° C. or higher as claimed in claim 1 wherein the impact-strength improving agent is a vulcanizable synthetic rubber.

3. The vinyl chloride resin-based composition for floppy disc jackets having a Clash-Berg temperature of 75° C. or higher as claimed in claim 1 wherein the N-substituted maleimide is N-tert-butyl maleimide or N-cyclohexyl maleimide.

* * * * *